United States Patent
Shastri et al.

(10) Patent No.: US 7,440,703 B2
(45) Date of Patent: Oct. 21, 2008

(54) HIGH-SPEED, SILICON-BASED ELECTRO-OPTIC MODULATOR WITH FEEDBACK CONTROL

(75) Inventors: Kalpendu Shastri, Orefield, PA (US); Prakash Gothoskar, Allentown, PA (US); Margaret Ghiron, Allentown, PA (US); Vipulkumar Patel, Monmouth Junction, NJ (US); Robert Keith Montgomery, Easton, PA (US); Soham Pathak, Allentown, PA (US); Katherine A. Yanushefski, Zionsville, PA (US)

(73) Assignee: SiOptical, Inc., Allentown, PA (US)

( * ) Notice: Subject to any disclaimer, the term of this patent is extended or adjusted under 35 U.S.C. 154(b) by 423 days.

(21) Appl. No.: 11/362,305

(22) Filed: Feb. 22, 2006

(65) Prior Publication Data
US 2006/0140645 A1    Jun. 29, 2006

Related U.S. Application Data

(62) Division of application No. 10/842,064, filed on May 10, 2004, now Pat. No. 7,065,301.

(60) Provisional application No. 60/468,885, filed on May 8, 2003.

(51) Int. Cl.
H04B 10/04    (2006.01)
G02B 26/00    (2006.01)
G02B 6/26    (2006.01)

(52) U.S. Cl. .......................... 398/183; 359/237; 385/50

(58) Field of Classification Search ......... 398/182–201; 385/14, 50; 359/237
See application file for complete search history.

(56) References Cited

U.S. PATENT DOCUMENTS

| | | | |
|---|---|---|---|
| 4,958,898 A | | 9/1990 | Friedman et al. |
| 6,166,846 A | * | 12/2000 | Maloney ..................... 359/247 |
| 6,233,070 B1 | * | 5/2001 | Lu et al. ........................ 359/9 |
| 6,374,000 B1 | | 4/2002 | Olesen |
| 6,384,954 B1 | | 5/2002 | Webb |
| 6,483,954 B2 | | 11/2002 | Koehl et al. |
| 6,542,280 B2 | | 4/2003 | Walklin |
| 6,549,321 B2 | | 4/2003 | Noda |
| 6,707,589 B2 | | 3/2004 | Bostak et al. |
| 2002/0101639 A1 | * | 8/2002 | Yano .......................... 359/181 |
| 2003/0030874 A1 | * | 2/2003 | Glingener et al. ........... 359/181 |
| 2004/0150873 A1 | * | 8/2004 | Pearsall ..................... 359/321 |
| 2004/0208454 A1 | * | 10/2004 | Montgomery et al. ......... 385/50 |
| 2005/0089257 A1 | * | 4/2005 | Barrios et al. .................. 385/2 |

* cited by examiner

*Primary Examiner*—Jason Chan
*Assistant Examiner*—Quan-Zhen Wang
(74) *Attorney, Agent, or Firm*—Wendy W. Koba

(57) ABSTRACT

An electro-optic modulator arrangement for achieving switching speeds greater than 1 Gb/s utilizes pre-emphasis pulses to accelerate the change in refractive index of the optical waveguide used to form the electro-optic modulator. In one embodiment, a feedback loop may be added to use a portion of the modulated optical output signal to adjust the magnitude and duration of the pre-emphasis pulses, as well as the various reference levels used for modulated. For free carrier-based electro-optic modulators, including silicon-based electro-optic modulators, the pre-emphasis pulses are used to accelerate the movement of free carriers at the transitions between input signal data values.

24 Claims, 14 Drawing Sheets

FIG. 4
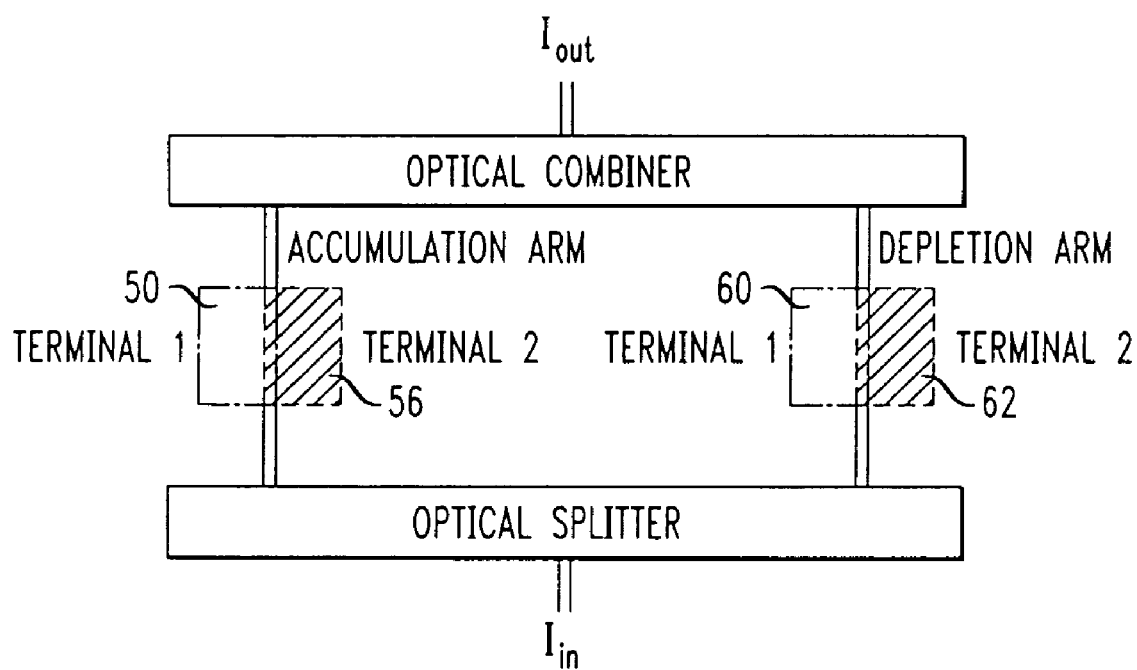
 WAVEGUIDE
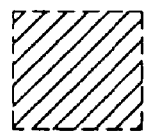 TERMINAL 1 MATERIAL n-poly
 TERMINAL 2 MATERIAL p SOI
ACTIVE WAVEGUIDE
AREA, INCLUDING TERMINAL 1, 2
AND INSULATOR

HIGH-SPEED, SILICON-BASED ELECTRO-OPTIC MODULATOR WITH FEEDBACK CONTROL

CROSS-REFERENCE TO RELATED APPLICATION

This is a continuation divisional of application Ser. No. 10/842,064 filed on May 10, 2004 now U.S. Pat. No. 7,065,301.

This application claims the benefit of Provisional Application No. 60/468,885, filed May 8, 2003.

TECHNICAL FIELD

The present invention relates to silicon-based electro-optic modulators and, more particularly, to the provision of high speed (e.g., greater than 1 Gb/s) modulators by incorporating channel equalization techniques into the modulator and associated electronic drive circuit.

BACKGROUND OF THE INVENTION

Optical transmission systems are generally based on one of two methods of modulation of an optical signal, either direct modulation or external modulation. In the first of these methods, the bias current applied to a laser is modulated, turning the laser "on" and "off". The disadvantage of this method is that when higher switching speeds are required, the dynamic behavior of the semiconductor material of the laser itself introduces distortion, primarily in the form of chirp. External modulation of an optical signal with a modulating electrical signal produces a modulated optical output signal with significantly reduced chirp, and external modulators have become preferred for high speed applications. In particular, electro-optic modulators such as Mach Zehnder interferometers are typically used for high speed applications.

For many years, external modulators have been made out of electro-optic material, such as lithium niobate. Optical waveguides are formed within the electro-optic material, with metal contact regions disposed on the surface of each waveguide arm. The application of a voltage to a metal contact will modify the refractive index of the waveguide region underneath the contact, thus changing the speed of propagation along the waveguide. By applying the voltage(s) that produce a π phase shift between the two arms, a nonlinear (digital) Mach-Zehnder modulator is formed. In particular, the optical signal is launched into the waveguide, and the 1/0 electrical digital signal input is applied to the contacts (using proper voltage levels, as mentioned above). The optical output is then "modulated" to create an optical 1/0 output signal. A similar result is possible with a linear (analog) optical output signal.

Although this type of external modulator has proven extremely useful, there is an increasing desire to form various optical components, subsystems and systems on silicon-based platforms. It is further desirable to integrate the various electronic components associated with such systems (for example, the input electrical data drive circuit for an electro-optic modulator) with the optical components on the same silicon substrate. Clearly, the use of lithium niobate-based optical devices in a such situation is not an option. Various other conventional electro-optic devices are similarly of a material (such as III-V compounds) that are not directly compatible with a silicon platform.

A significant advance in the ability to provide optical modulation in a silicon-based platform has been made, however, as disclosed in our co-pending application Ser. No. 10/795,748, filed Mar. 8, 2004. FIG. 1 illustrates one exemplary arrangement of a silicon-based modulator device as disclosed in our co-pending application. In this case, a "MOSCAP" structure 1 in terms of a doped (i.e., "metal-like") silicon layer 2 (usually polysilicon) is disposed over a doped portion of a relatively thin (sub-micron) surface layer 3 of a silicon-on-insulator (SOI) wafer 4, this thin surface layer 3 often being referred to in the art as the "SOI layer". A thin dielectric layer 5 is located between the doped, "metal"-like" polysilicon layer 2 and the doped SOI layer 3, with the layers disposed so that an overlap is formed, as shown in FIG. 1, to define an active region of the device. Free carriers will accumulate and deplete on either side of dielectric layer 5 as a function of voltages applied to SOI layer 3 (VREF3) and/or polysilicon layer 2 (VREF2). The modulation of the free carrier concentration results in changing the effective refractive index in the active region, thus introducing phase modulation of an optical signal propagating along a waveguide formed along the active region (the waveguide being in the direction perpendicular to the paper).

As of now, such silicon-based electro-optic modulators have been optimized to minimize the optical loss. The optical loss is controlled by reducing optical signal absorption along the extent of the waveguide. Since the absorption is directly related to the carrier doping density, a minimal optical loss requires a minimal dopant density in both polysilicon layer 2 and SOI layer 3. However, this optical loss specification runs in direct opposition to the desire for high speed operation. That is, to provide a high speed (i.e., switching speed greater than 1 Gb/s) device, a relatively high doping density is required. Inasmuch as system requirements are even now moving toward 10 Gb/s, there is a strong need to increase the switching speed of a silicon-based electro-optic modulator, without sacrificing optical power to attain high speed operation.

SUMMARY OF THE INVENTION

The need remaining in the prior art is addressed by the present invention, which relates to silicon-based electro-optic modulators and, more particularly, to the provision of high speed (e.g., greater than 1 Gb/s) modulators by incorporating channel equalization techniques into the modulator and associated electronic drive circuit.

In accordance with the present invention, channel equalization is achieved by developing a doping profile for the device terminals that provides the desired limit of optical loss. For a given doping profile, there will be an associated maximum switching speed at which the modulator will function when using a simple drive circuit (i.e., a transition between two reference voltage levels, such as VDD and VSS, to switch between an optical "0" and an optical "1"). To increase the switching speed in accordance with the present invention, pre-emphasis voltages are applied during transitions between "1" and "0" (falling edge transitions), as well as between "0" and "1" (rising edge transitions), where the pre-emphasis voltage will accelerate charging and discharging of the MOSCAP (or modulator active capacitance), thus reducing the fall and rise times respectively between states. It should be understood that the output impedance of such pre-emphasis circuits should be as low as possible and in fact approach a voltage source for those modulators driven by voltage type signals. Therefore, the pre-emphasis circuits and techniques described hereinbelow also allow for an impedance transformation from the data source (usually a 50Ω impedance) to a much lower value (certainly less than 25Ω and usually about 1Ω), thus approaching an ideal voltage source.

In one embodiment of the present invention, the optimum pre-emphasis voltage levels and pulse durations may be defined during manufacture, on a device-by-device basis, and stored in a microprocessor-related memory (or other memory type device) co-located with the modulator. In a further advance of this embodiment, a feedback technique may use a table of reference voltages and associated pre-emphasis voltage/duration values (stored in the look-up table), where as modulation conditions change (i.e., temperature, supply voltage variations, lifetime aging etc.), the optimum parameter values may be selected from the database to adjust the device performance. Finally, the use of pre-emphasis to extend the channel bandwidth reduces the pattern dependent jitter by increasing the bandwidth of the channel. In particular, a portion of the optical output signal may be tapped off and analyzed to determine the necessary changes.

A preferred layout arrangement of the present invention utilizes a plurality of separate contact points along the length of the polysilicon layer and the SOI layer in the contact region. Since the speed of light is finite in silicon, the "flight time" of the optical signal along the length of the modulator may become a significant portion of the bit period. Thus, by fanning out (i.e., distributing) the electrical signal input along the extent of the active region, the entire waveguide is essentially energized simultaneously such that all parts of the waveguide instantaneously see the change in voltage.

Other and further advantages, embodiments and features of the present invention will become apparent during the course of the following discussion and by reference to the accompanying drawings.

BRIEF DESCRIPTION OF THE DRAWINGS

Referring now to the drawings,

FIG. 4 illustrates a simplified block diagram for a Mach Zehnder interferometer modulator showing the individual accumulation and depletion arms of the design;

DETAILED DESCRIPTION

Figure 1:
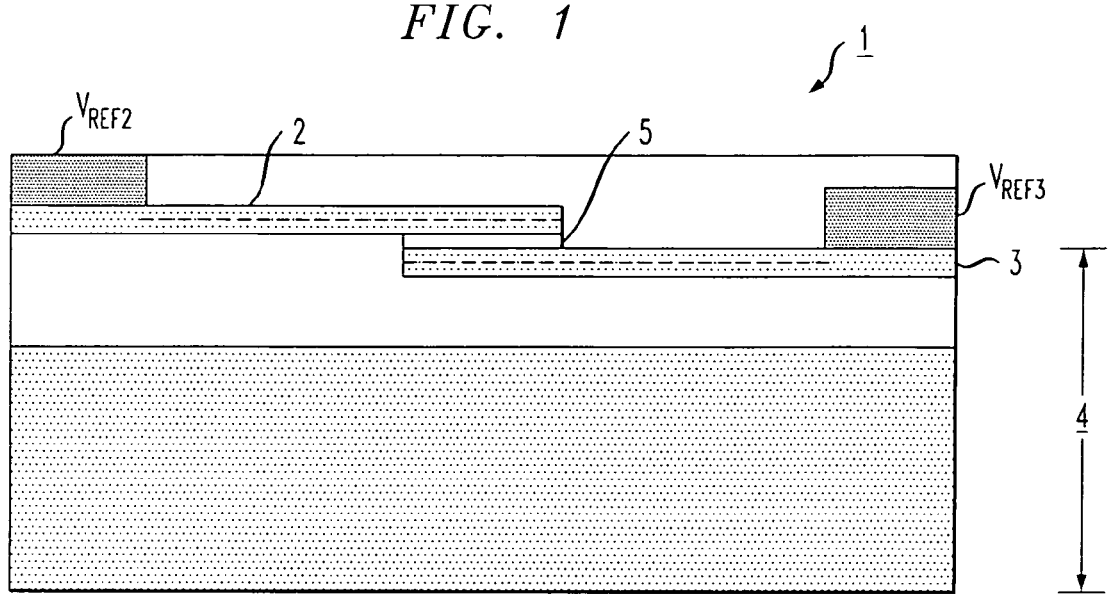
FIG. 1 is an exemplary arrangement of a silicon-based modulator device.
Figure 2:
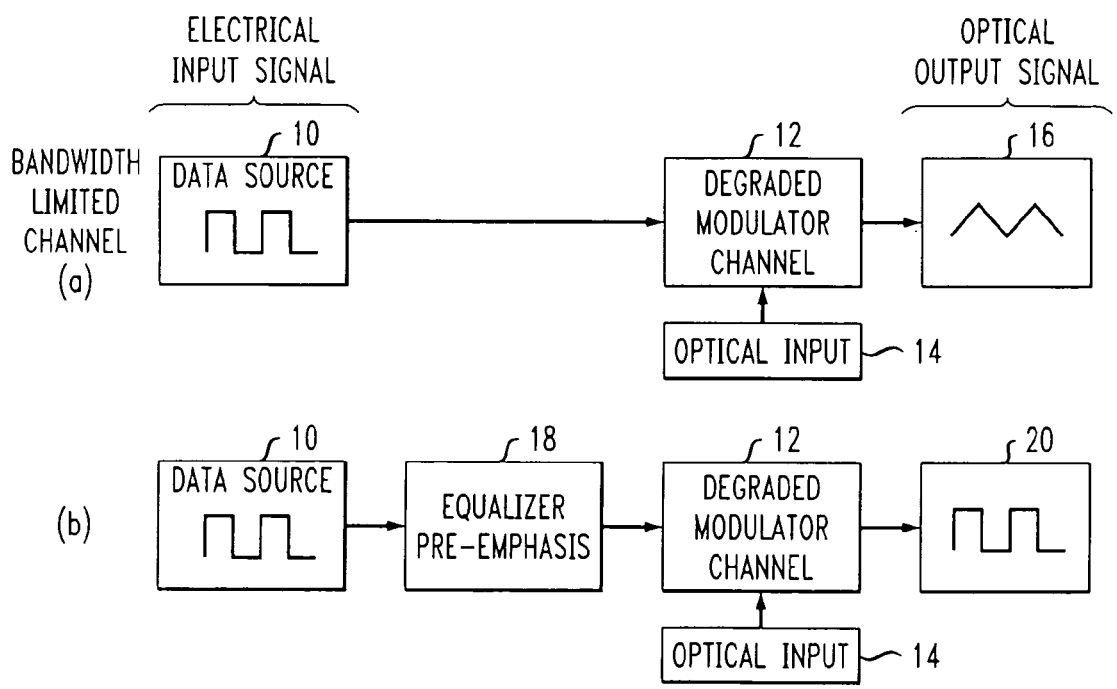
FIG. 2(a) illustrates, in simplified block diagram form, a bandwidth-limited nonlinear channel, with FIG. 2(b) illustrated the same channel, but showing the use of an equalizer/pre-emphasis circuit of the present invention to improve the optical output characteristics of a high speed optical modulator.

FIG. 2 illustrates, in simplified form, a nonlinear channel equalization arrangement showing the use of an equalizer/pre-emphasis circuit of the present invention to improve the optical output characteristics of a high speed optical modulator. FIG. 2(a) illustrates a bandwidth limited channel arrangement, where an electrical input data signal from a data source 10 is applied as the electrical input to a silicon-based modulator structure 12, such as the modulator illustrated in FIG. 1. It is to be understood that the theory of the present invention is equally applicable to any type of electrically driven optical modulator, that is, a modulator where the refractive index properties of an optical waveguide are changed by modulating an electrical input signal to produce a modified optical output signal. Such electro-optic modulators include, but are not limited to, free carrier-based modulators, particularly silicon-based electro-optic modulates.

Referring back to FIG. 2, an optical input from a light source 14 is applied as the second input to modulator 12, where as discussed in our above-cited co-pending application, the optical signal is coupled into the relatively thin SOI layer (such as SOI layer 3 of FIG. 1) and thereafter propagates along the active region of the waveguide structure. Once the switching speed of the electrical input signal from source 10 goes above a certain value (for example, above 1 Gb/s), the free carriers in the silicon-based modulator cannot charge or discharge the modulator fast enough to completely change state during the bit period. At this point, therefore, the modulator performance begins to degrade, and the optical output signal becomes distorted, as shown by element 16 in FIG. 2(a).

FIG. 2(b) illustrates, in simplified form, the solution as proposed by the present invention, where an equalizer/pre-emphasis circuit 18 is disposed between the electrical input source 10 and modulator structure 12. Equalizer/pre-emphasis circuit 18 is configured to recognize each transition between the logic levels in the input signal, and insert an additional "boost" to the voltage applied at the transition. This pre-emphasis voltage pulse functions to accelerate the free carrier movement, so that essentially all of charging or discharging has completed by the end of the bit period. Therefore, the optical output signal, as shown by element 20, remains clean, with sharp, clearly-defined transitions between optical "1" and optical "0". Equalizer/pre-emphasis circuit 18 thus allows for the bandwidth of modulator structure 12 to be extended without increasing the optical loss of the system. Indeed, the doping profile within the active region can remain at a relatively low level (for example, $1 \times 10^{19}$ cm$^{-3}$) and still provide optical switching greater than 1 Gb/s.

Figure 3:
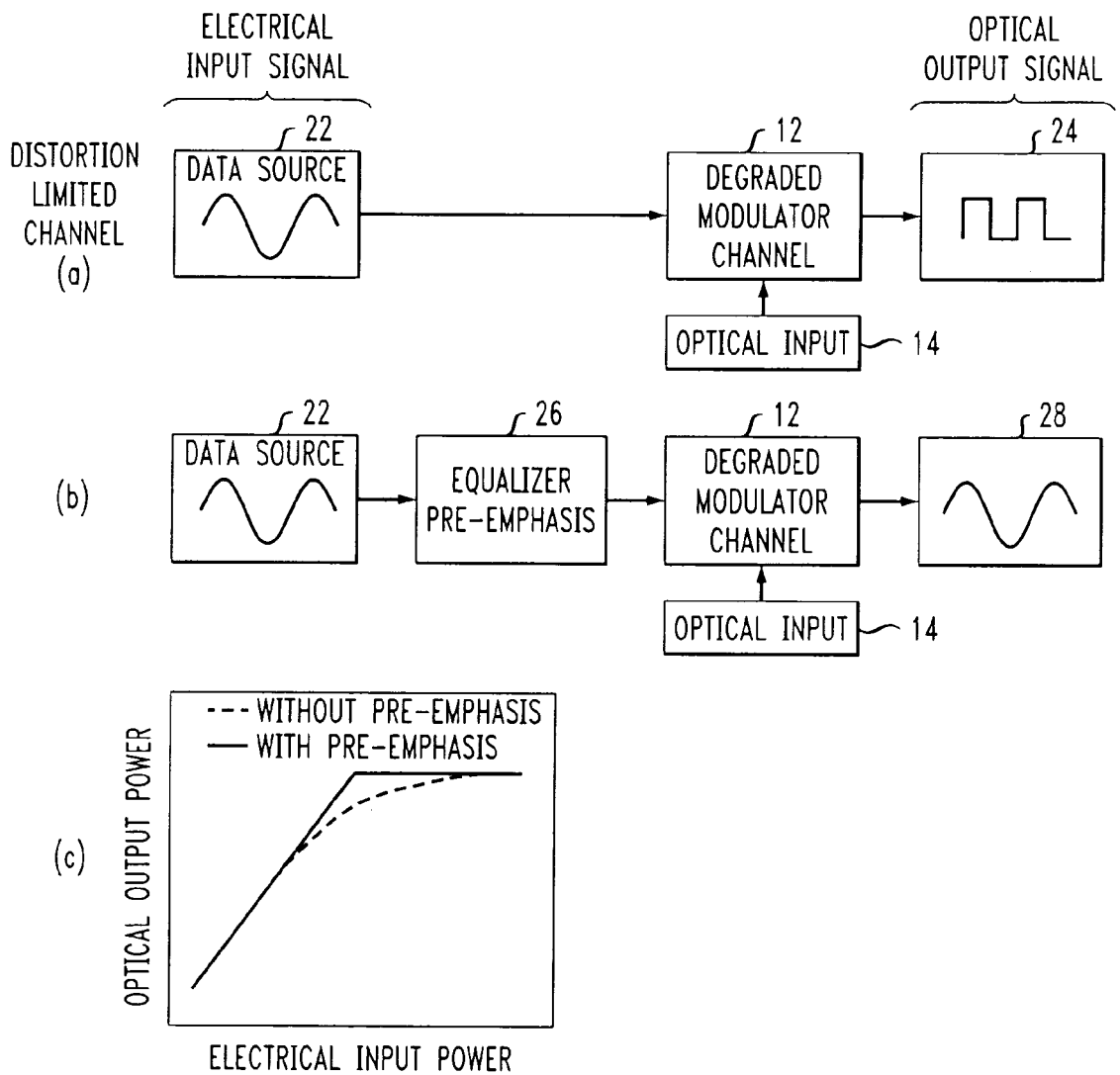
FIG. 3 illustrates, in simplified block diagram form, a linear channel equalization arrangement, the contrast between a distortion limited channel arrangement (FIG. 3(a)) and an arrangement utilizing an equalizer/pre-emphasis circuit in accordance with the present invention (FIG. 3(b)) to linearize the modulator channel.

As mentioned above, the channel equalization technique of the present invention is equally applicable to linear systems, utilizing an analog input signal (for example, an amplitude modulated signal). FIG. 3 illustrates a simplified linear channel equalization arrangement in block diagram form, the contrast between a distortion limited channel arrangement (FIG. 3(*a*)) and an arrangement utilizing an equalizer/pre-emphasis circuit in accordance with the present invention (FIG. 3(*b*)) to linearize the modulator channel. In this case, modulator 12 and optical source 14 are the same as those associated with FIG. 2. A linear electrical signal source 22 is illustrated as being applied as the electrical input to modulator 12. Once the amplitude of this electrical input signal increases above a predetermined level, the optical output will no longer be able to track the linear input signal and the optical output begins to saturate causing output distortion. This saturation results in the "abrupt" transitions as illustrated in output element 24 of FIG. 3(*a*). The use of pre-emphasis circuit 26, in accordance with the present invention, functions to boost the extremes of the linear input voltage signal (i.e., pre-emphasis), thus increasing the linear range of the modulator. The resultant output, as shown in element 28, thus more closely tracks the shape (and frequency) of the input. Advantageously, the use of pre-emphasis as a linear channel equalization technique provides an improvement in the optical output power, as illustrated in FIG. 3(*c*), which contains plots of the optical output power as a function of the electrical input power, the dashed curve associated with the arrangement without pre-emphasis. As shown, there is a gradual, asymptotic curve toward the maximum power for this arrangement. In contrast, the arrangement of the present invention including pre-emphasis allows for a constant increase in optical output power increasing the linear dynamic range, reaching the maximum value without gain compression avoiding signal distortion. Ultimately at some power level, clipping occurs causing distortion but linearized devices are not operated at or above the saturation point. In fact, significant linear range is achieved using pre-emphasis well before reaching the saturation point. The saturation point can only be increased by increases in the operating supply voltage.

FIG. 4 illustrates a simplified block diagram for an exemplary Mach Zehnder interferometer modulator showing the individual accumulation and depletion arms of the design. Each arm of the interferometer contains a phase modulator device with two terminals. Terminal 1 is made from a silicon (often polysilicon) layer 2 as described in FIG. 1, doped n-type as region 50 in the accumulation arm and 60 for the depletion arm. Terminal 2 is formed in the SOI layer 3 also shown in FIG. 1, doped p-type as region 56 in the accumulation arm and 62 for the depletion arm.

Figure 5:
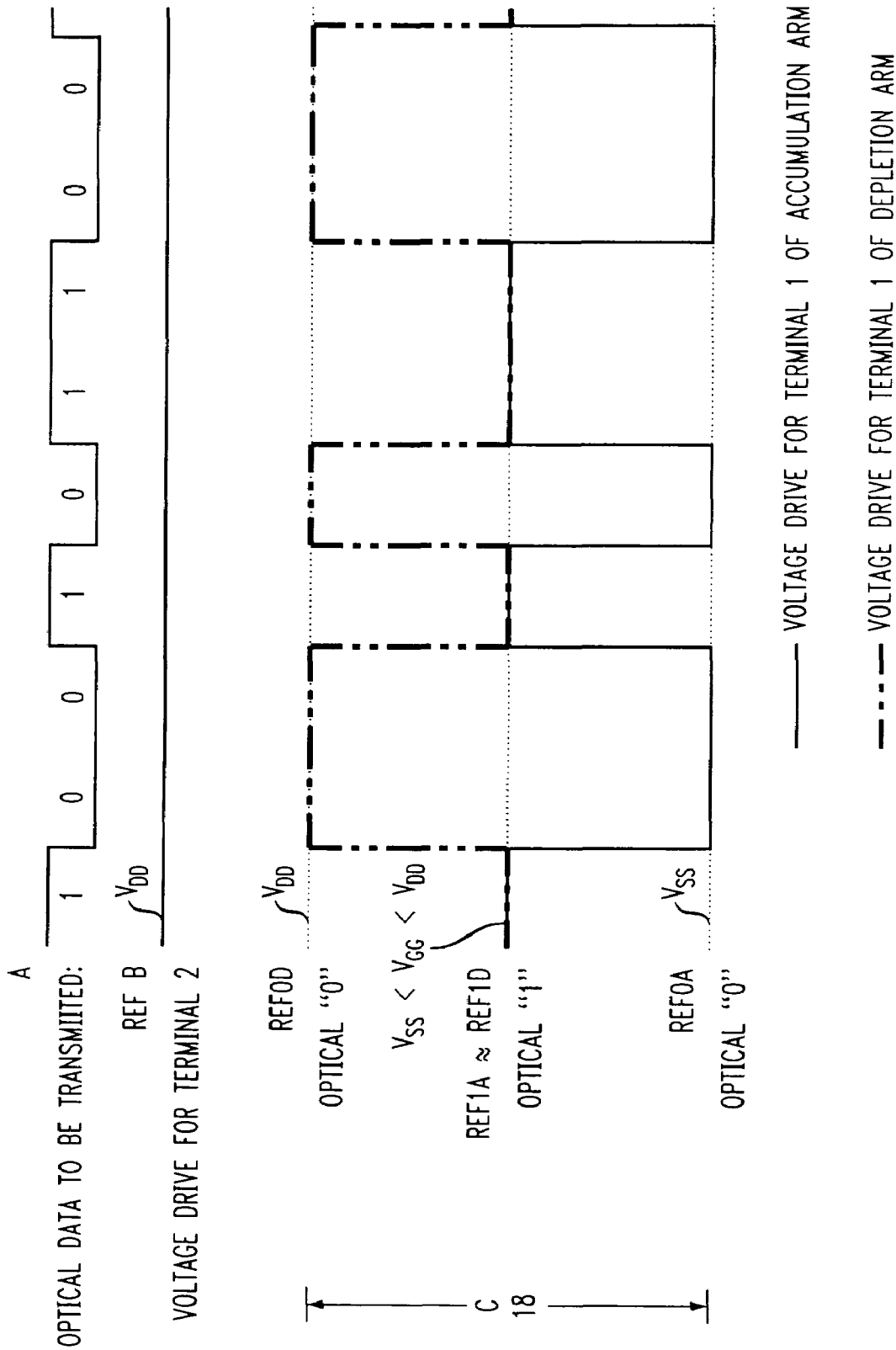
FIG. 5 contains a set of reference voltages and drive patterns associated with the bandwidth-limited channel arrangement of FIG. 2(a) and the distortion-limited channel arrangement of FIG. 3(a)

FIG. 5 contains a set of reference voltages and drive patterns associated with the bandwidth-limited channel arrangement of FIG. 2(*a*) and distortion-limited channel arrangement of FIG. 3(*a*). The exemplary optical data to be transmitted is illustrated along the top trace A in FIG. 5. One arrangement for providing this data pattern as an input to modulator 12 is for the output from electrical data source 10 to hold one terminal at a pre-defined reference potential (in this case "terminal 2" is held at VDD), shown as trace B. The remaining terminal ("terminal 1") is then moved about a second reference potential (REF1A/REF1D) to define optical "1" and "0", as shown in trace C. Referring to FIG. 5, the state of optical "1" is defined when terminal 1 of both the accumulation and depletion arms of a modulator of FIG. 4 are held at this pre-defined reference voltage (i.e., REF1A≈REF1D). For an optical "0", the depletion arm terminal 1 switches to a higher voltage (REF0D), which may be as high as VDD (but not necessarily equal to VDD), and the accumulation arm terminal 1 switches to a lower voltage (REF0A), which may be as low as VSS (but not necessarily equal to VSS). If the arrangement is driven rail-to-rail (that is, between VDD and VSS), there is a natural RC time constant that then limits the switching speed of the modulator.

Figure 6:
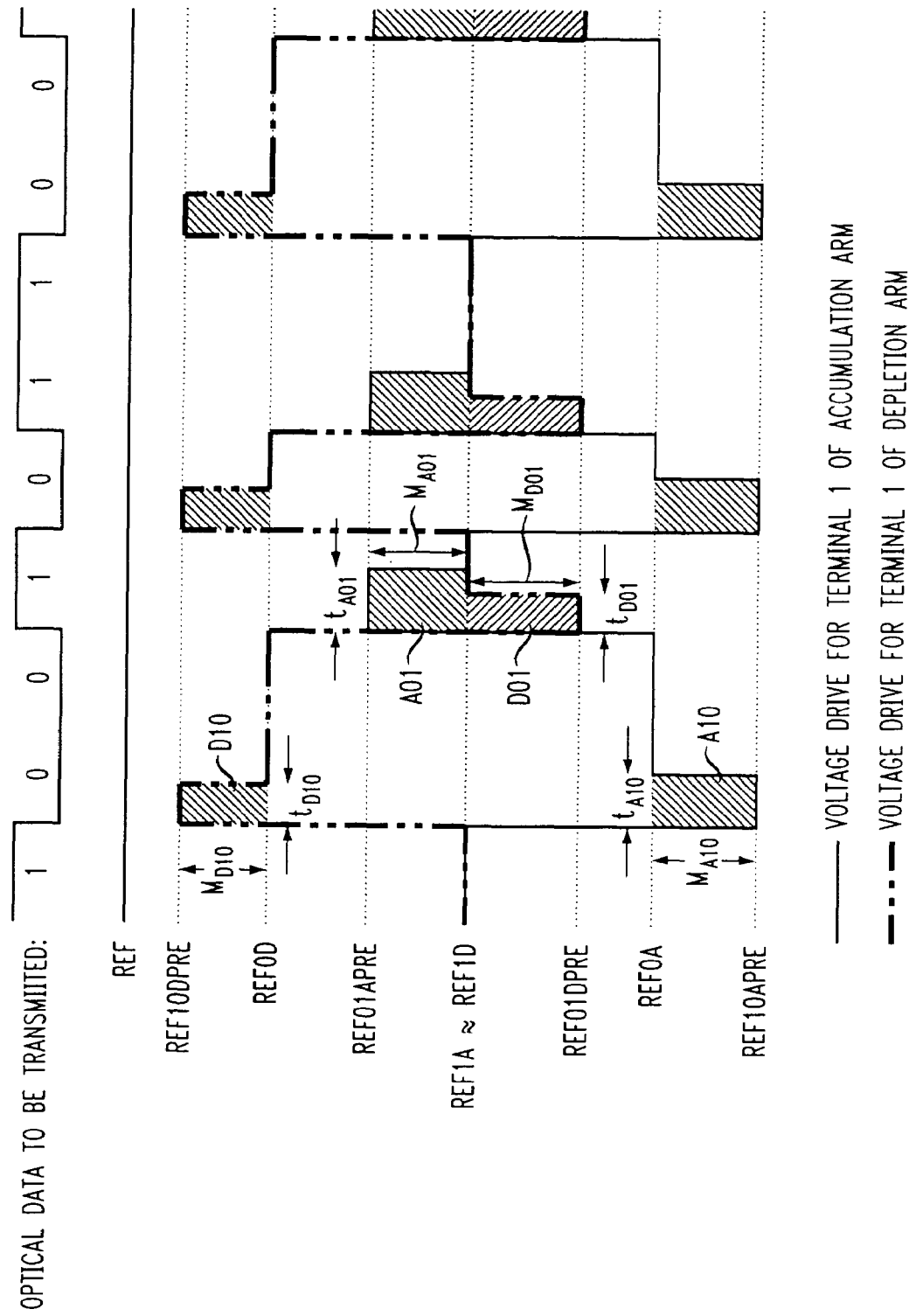
FIG. 6 contains an exemplary set of reference voltages and drive patterns including pre-emphasis that can be used to accomplish increased switching speed (greater than 1 Gb/s) in accordance with the present invention.

As illustrated in FIGS. 2(*b*) and 3(*b*), this limitation of the bandwidth limited and distortion limited channels respectively, can be overcome by adding electrical signal pre-emphasis at each transition between an optical "0" and an optical "1" (and vice versa), where the pre-emphasis will accelerate carrier movement and increase switching speed. FIG. 6 contains an exemplary set of reference voltages and drive patterns including pre-emphasis that can be used to accomplish increased switching speed (greater than 1 Gb/s) in accordance with the present invention. As with the prior art set of drive patterns shown in FIG. 5, "terminal 2" in the pre-emphasis case can be held at a predetermined reference potential (e.g., VDD), and the voltage applied to "terminal 1" changed as a function of the data pattern to impose this data pattern on the propagating optical signal. Also similar to the arrangement associated with the drive patterns of FIG. 5, the state of optical "1" is defined for the inventive arrangement when terminal 1 of both the accumulation and depletion arms of a modulator of FIG. 4 are held at essentially the same pre-defined reference voltage (i.e., REF1A≈REF1D).

During the first transition from optical "1" to optical "0" (a falling edge transition), as shown in FIG. 6, the voltage applied to terminal 1 of the depletion arm includes an initial pulse that will over-shoot the voltage level associated with the steady-state value of optical "0" (REF0D), the initial pulse having a magnitude $M_{D10}$ and time duration $t_{D10}$ sufficient to accelerate the movement of free carriers out of the depletion arm device channel. This shaded pulse region is illustrated as "D10" in FIG. 6, where the same pulse D10 will be applied to the depletion arm for every transition from optical "1" to optical "0". In a similar fashion, the voltage applied to terminal 1 of the accumulation arm includes an initial pulse that over-shoots the voltage level associated with the steady-state value of optical "0" (REF0A), where the pulse magnitude $M_{A10}$ and time duration $t_{A10}$ are chosen to accelerate the accumulation of free carriers in the accumulation arm device channel. This shaded pulse region is illustrated as "A10" in FIG. 6, wherein the same pulse A10 will be applied to the accumulation arm for every (falling edge) transition from optical "1" to optical "0".

In a similar fashion, pre-emphasis may also be used during the transition from optical "0" to optical "1", to again enhance the movement of free carriers and enable higher switching speeds. Referring to FIG. 6, during a transition from optical "0" to optical "1", an over-shoot pulse, denoted D01 is added to the voltage change needed to switch the accumulation arm from REF0D to REF1D, where pulse D01 is illustrated as comprising a predetermined magnitude $M_{D01}$ and time duration $t_{D01}$. The pre-emphasis associated with the accumulation arm is illustrated as pulse A01, having a magnitude of $M_{A01}$ and time duration $t_{A01}$. It is to be noted that each of the various pulse magnitudes and time durations for the "1" to "0" transition and "0" to "1" transition for both the accumulation and depletion arms may be different, since the movement of free carriers in each state may be different and may require pulses of higher/lower magnitude, and for a longer/shorter time duration. It is an aspect of the present invention to individually tailor each one of these variables for each case, thus optimizing the movement of free carriers and enabling high speed operation for the optical modulator. Moreover, there may be instances where only "rising edge" pre-emphasis is desired, or perhaps only "falling edge" pre-emphasis. All of these cases are considered to fall within the scope of the present invention.

Figure 7:
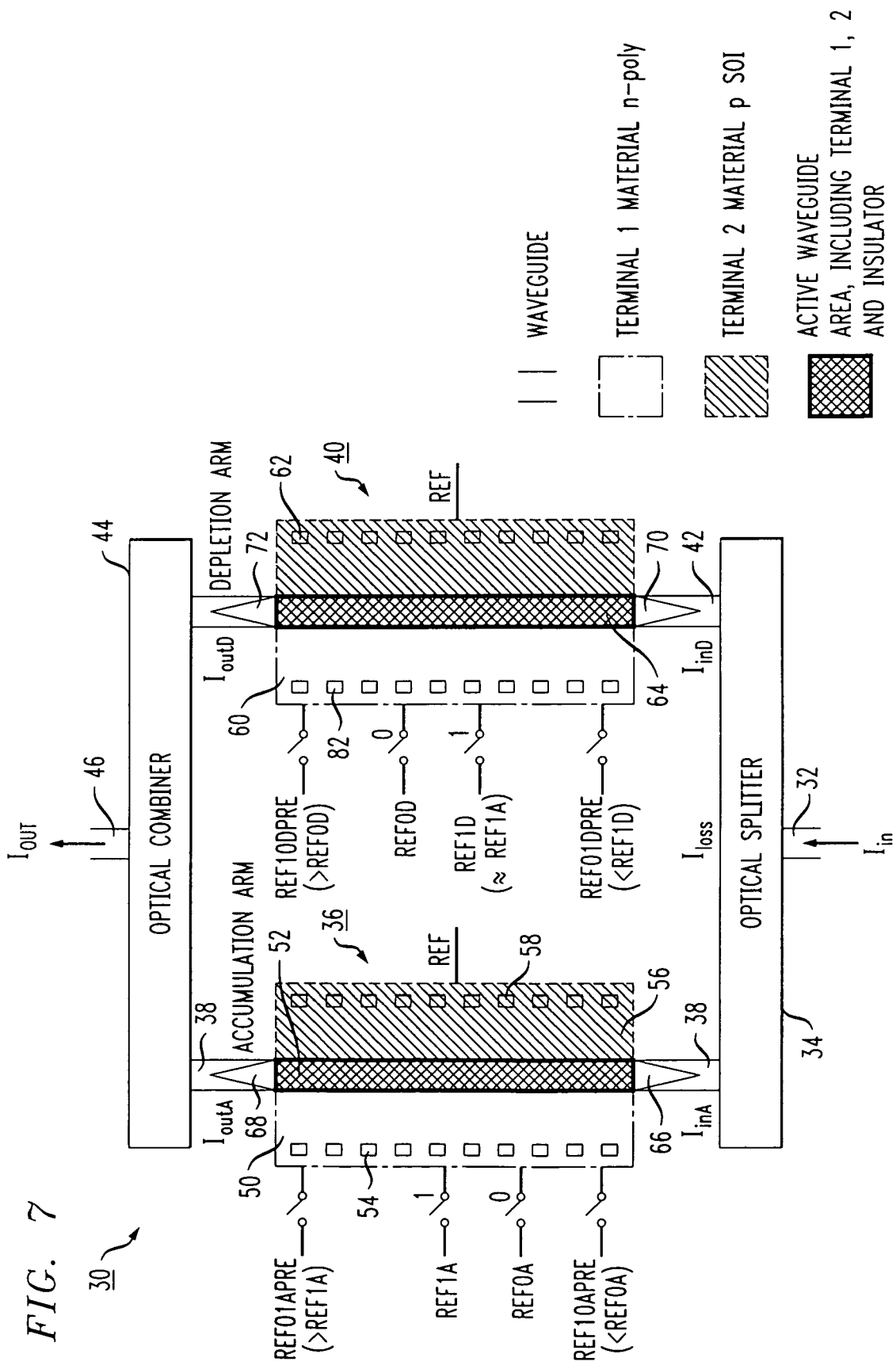
FIG. 7 is a top view, in simplified form, of an exemplary Mach-Zehnder electro-optic modulator formed in accordance with the present invention to provide for high speed (greater than 1 Gb/s) operation.

FIG. 7 is a top view, in simplified form, of an exemplary Mach-Zehnder electro-optic modulator 30 formed in accordance with the present invention to provide for high speed (greater than 1 Gb/s) operation. An optical signal $I_{in}$ is illustrated as traveling along an input waveguide 32 and entering an optical splitter 34. As discussed in our above-cited co-pending application and with reference to FIG. 1 herein, input waveguide 32 and optical splitter 34 may be formed within the SOI layer of an SOI wafer (such as SOI layer 3 of FIG. 1). Optical splitter 34 may simply divide the optical power present in the signal in half, such that a balanced 50/50 split of signal $I_{in}$ is presented to each arm of modulator 30. However, any other split may be used, or even desired, depending on the parameters of the accumulation and depletion arms (parameters such as doping concentration, length of each active area, materials used to form terminal 1 and terminal 2, etc.). As shown in FIG. 7, a first output from optical splitter 34 denoted as $I_{inA}$ is thereafter applied as the optical input signal to accumulation arm 36, where optical signal $I_{inA}$ propagates along an optical waveguide 38 formed along the extent of accumulation arm 36. A second output from optical splitter 34, denoted as $I_{inD}$, is thereafter applied as the optical input signal to depletion arm 40, where optical signal $I_{inD}$ propagates along an optical waveguide 42 formed along the extent of depletion arm 40. It is noted that some loss will inevitably occur within optical splitter 34, where this loss is denoted by signal $I_{loss}$ in FIG. 7. Subsequent to being modulated within their respective active waveguide areas, the modulated optical signals $I_{outA}$ and $I_{outD}$ will be combined within an optical combiner 44 and thereafter propagate as modulated signal $I_{out}$ along an output waveguide 46.

As described in detail in our above-cited co-pending application, the active waveguiding areas where modulation occurs are formed by overlapping portions of the SOI layer (such as SOI layer 3 of FIG. 1) and an overlying silicon layer (for example, polysilicon layer 2 of FIG. 1), with a relatively thin dielectric layer (layer 5) disposed therebetween. The dielectric layer is not evident in the top view of modulator 30 of FIG. 7, but is visible in the device side view of FIG. 1. Referring to accumulation arm 36, the "terminal 1" material, illustrated as region 50, comprises a portion of silicon (usually polysilicon) layer 2 of FIG. 1 that has been doped (for example, "n" doped), where the doping profile may be preferably controlled in accordance with the present invention to form a lightly doped portion within active waveguide area 52, and a more heavily doped portion along the terminal 1 electrical contact area 54. The "terminal 2" material, which may comprise SOI layer 3 of FIG. 1, is formed as shown under doped region 50 of terminal 1. Terminal 2 SOI region 56 (which is oppositely doped with respect to the terminal 1 region) is formed to overlap region 50 in active waveguide area 52, then extend in the opposite direction to form its contact area 58. As before, the doping density of region 56 is maintained at a lower level in active waveguide area 52 to minimize optical loss (while allowing for a heavier doping density in contact area 58).

Polysilicon regions 50 and 60, in a preferred embodiment, include input and output tapered regions to present a graded index change to an optical signal entering and exiting active waveguide areas 52 and 64, thus minimizing optical reflections at the inputs and outputs of the associated active waveguide areas. Referring to FIG. 7, polysilicon region 50 is illustrated as including an input taper 66 and an output taper 68, and polysilicon region 60 is illustrated as including an input taper 70 and an output taper 72. The input tapers 66 and 70 function to gradually increase the effective refractive index of the waveguide layer, where the gradual tapers will introduce less reflection than simply disposing a polysilicon layer over the SOI layer and introducing an abrupt change in refractive index to a propagating optical signal. In a similar fashion, output tapers 68 and 72 will gradually decrease the effective refractive index. A detailed description of the use of such tapered polysilicon layers may be found in our co-pending application Ser. No. 10/818,415, filed Apr. 5, 2004.

In terms of applying the electrical modulating signals, and with reference to FIGS. 6 and 7, SOI regions 56 and 62, being defined as the "terminal 2" inputs for accumulation arm 36 and depletion arm 40, respectively, are coupled, in this particular example, to a reference voltage (such as VDD in this embodiment). A set of four different input signals are shown as coupled (in this embodiment) to the "terminal 1" connections for accumulation arm 36 and depletion arm 40. These signals correspond to those discussed above in association with FIG. 6, namely, a "pre-emphasis" pulse for an optical "0" to "1" transition, a reference level for optical "1", a reference level for optical "0", and a pre-emphasis pulse for an optical "1" to "0" transition. In accordance with the particular data pattern, these various inputs are controlled to apply the proper pre-emphasis signals at each transition, followed by the proper reference level for the remainder of the duration of the particular logic level.

Figure 8:
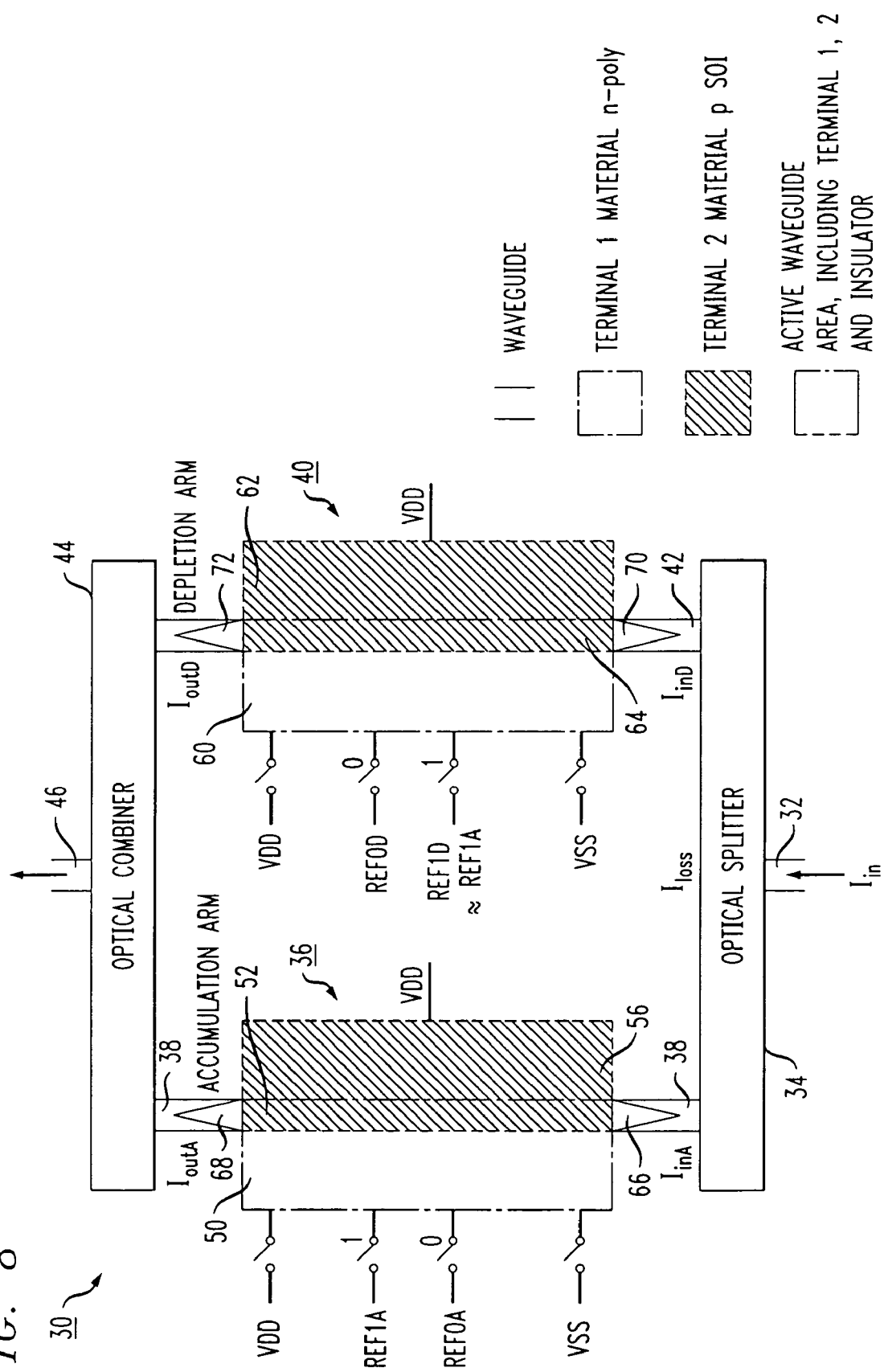
FIG. 8 is a preferred embodiment of the modulator of FIG. 7, in terms of the voltage levels used to define the reference voltages and the pre-emphasis voltages.
Figure 9:
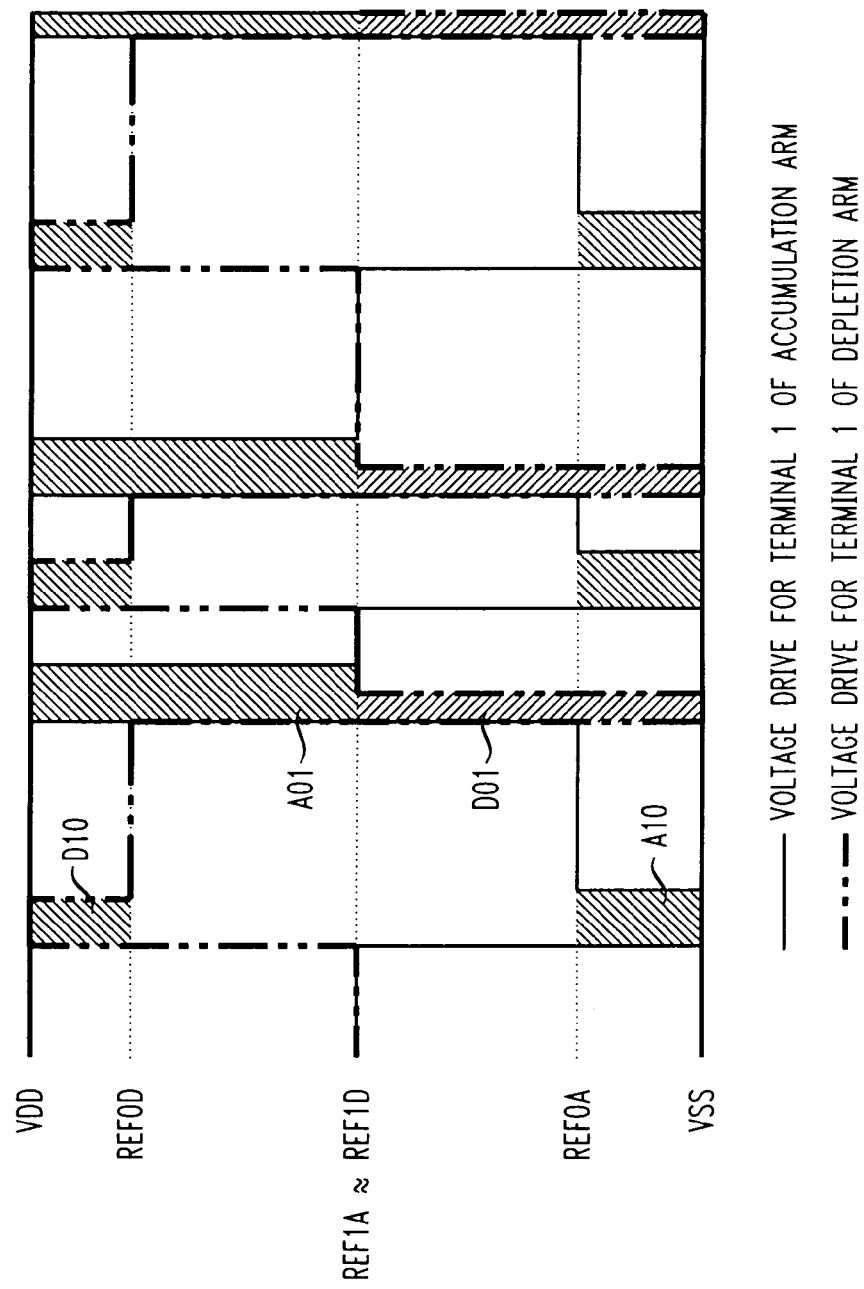
FIG. 9 is a diagram of the reference voltages and drive patterns associated with the arrangement of FIG. 8.

FIG. 8 is a preferred embodiment of modulator 30 of FIG. 7, in terms of the voltage levels used to define the reference voltages and the pre-emphasis voltages. FIG. 9 is a diagram of the reference voltages and drive patterns associated with the arrangement of FIG. 8. As shown, "terminal 2" is fixed at a reference voltage potential of VDD (the conventional drain voltage for CMOS applications). The maximum voltage level for applying a pre-emphasis pulse to terminal 1 of accumulation arm 36 for an optical "0" to "1" transition is also defined as VDD. Similarly, the VDD voltage level is used to define the maximum level of a pre-emphasis pulse for a "1" to "0" transition on depletion arm 40. As also shown in FIG. 9, the conventional source voltage level VSS is used to define the maximum value for a pre-emphasis pulse for a "1" to "0" transition on accumulation arm 36 and a "0" to "1" transition on depletion arm 40. The reference voltage level for a steady-state optical "1" is defined as the midpoint between VDD and VSS, with the reference voltage for a logic "0" (REF0D) on depletion arm 40 being greater than this midpoint value, but less than VDD, and the reference voltage for a logic "0" (REF0A) on accumulation arm 36 being less than this midpoint value, but greater than VSS.

In silicon, the velocity of light is approximately $0.833 \times 10^8$ m/sec. Since an exemplary modulator of the present invention is about 1 mm in length (a typical value), the transit time for an optical signal to propagate from the input to the output of the modulator is approximately 12 psec. For the relatively high speed applications particularly well-suited for the invention, 12 psec may become a significant portion of a bit period, thus leading to increases in bit error rate. Therefore, in association with an improved embodiment of the present invention, the electrical contacts to regions 50 and 60 are disposed in a "fan-out" configuration along the length of the modulator active waveguide area. FIG. 7 illustrates a first plurality of contacts 54 disposed along the length of region 50 and a second plurality of contacts 82 disposed along the length of region 60. If contacts are made to both the "terminal 2" and "terminal 1" regions, a series of contacts may be formed on each region as shown in FIG. 7. Each contact or small group of contacts, can be energized by a separate metal line (not shown) and transistor (also not shown) forming a parallel distribution network turning the device on and off along the full length at the same time without propagation delay differences between one end of the device and the other. It is to be understood, however, that there may be some situations where it is desired to impart a time delay between the input and output (to introduce negative chirp into the signal, for example), so in those cases relatively few, or only one, contact is required.

As mentioned above, there exist fabrication and environmental differences that may affect the performance of an electro-optic modulator, both in terms of determining the proper reference voltage levels and in terms of determining the magnitude, polarity and duration of the pre-emphasis pulses. Fabrication variations (such as, for example, differences in doping density) may be studied at the end of the fabrication process to determine the optimum voltage levels and durations, with this information stored in a memory element (such as a non-volatile memory look-up table) co-located with the modulator (the memory element being either on-chip or off-chip). More importantly, a feedback arrangement can be used to continuously monitor the optical output from the modulator and adjust one or more of the control signals, as need be, to maintain an optimum output signal. The feedback arrangement may also provide adaptive, real time updating of the look-up table constants.

Figure 10:
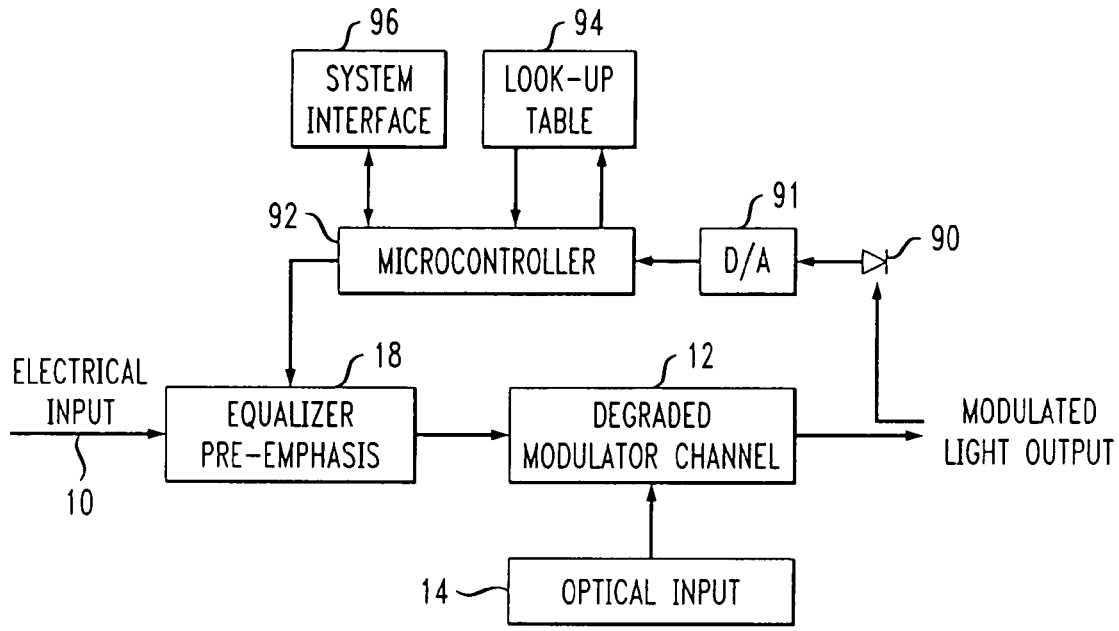
FIG. 10 illustrates, in block diagram form, an exemplary modulator arrangement of the present invention, including a feedback loop between the modulator output and the equalizer/pre-emphasis circuit.

FIG. 10 illustrates, in block diagram form, an exemplary modulator arrangement of the present invention, including a feedback loop between the modulator output and equalizer/pre-emphasis circuit 18. As shown, a portion of the modulated output signal (preferably, a relatively small portion) is tapped off from the output and applied as an input to a photodiode 90, which converts the optical signal into an electrical signal. In this particular embodiment, the analog electrical output from photodiode 90 is then passed through an A/D converter 91 to form a digital feedback signal. The digital feedback signal is then applied as an input to a micro-controller 92. The characteristics of this digital feedback signal are then analyzed using digital signal processing techniques and compared against pre-defined "control" values (which may have been stored in a look-up table 94) to assess the performance of the modulator. Indeed, as a function of various environmental changes that may take place (temperature variations, supply voltage variations, etc.), it may be necessary to change one or more of the reference values applied to pre-emphasis circuit 18 (including both the magnitude and duration of the pre-emphasis pulse). Therefore, a set of different reference voltage values associated with various operating conditions may also be stored in look-up table 94 and transmitted as adjustment inputs to pre-emphasis circuit 18. A system interface 96 is included and may be used to interface with an external control system (not shown) to send information about circuit adjustments to a centralized record keeping facility and/or receive updated information (including, perhaps, changes in algorithms used in the digital control circuit 92) from a centralized control source.

Figure 11:
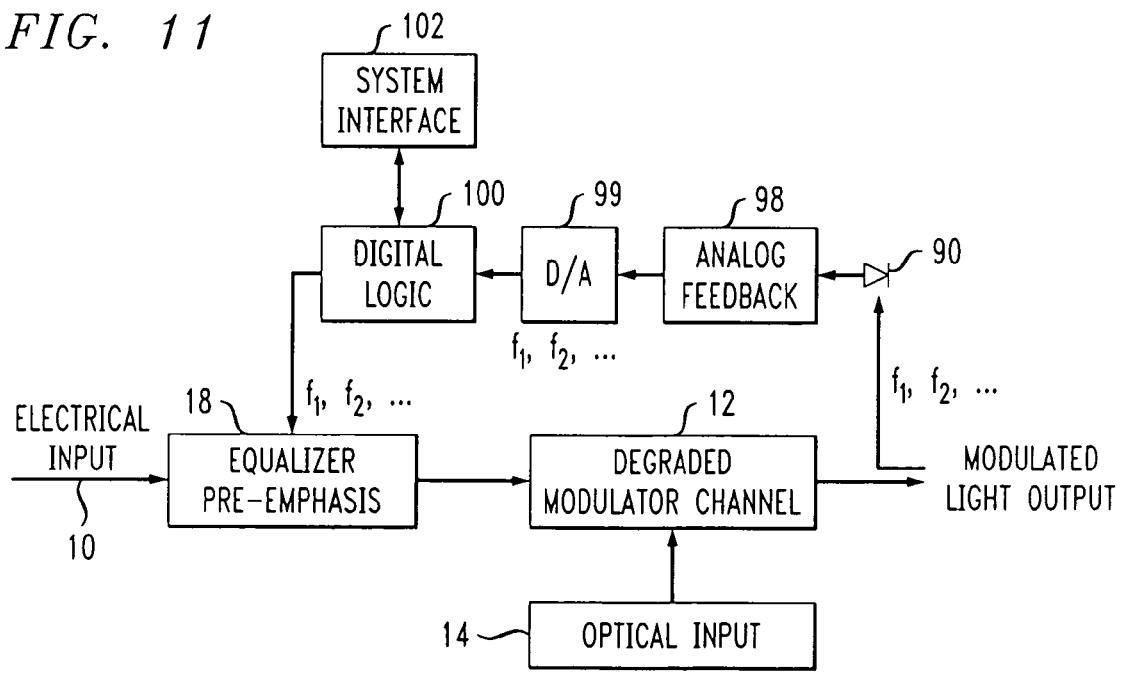
FIG. 11 illustrates another embodiment of a feedback arrangement that may be used with an electro-optic modulator formed in accordance with the present invention, with a tapped-off output signal converted by a photodiode into an analog electrical signal.

FIG. 11 illustrates another embodiment of a feedback arrangement that may be used with an electro-optic modulator formed in accordance with the present invention. In this case, the tapped-off output signal is again converted by photodiode 90 into an analog electrical signal. In this arrangement, the electrical signal is applied as an input to an analog feedback circuit 98 that performs one or more analyses on the output signal, providing a plurality of outputs that are passed through an A/D converter 99 and then applied as an input to a digital logic element 100. The combination of analog feedback circuit 98 and digital logic element 100 is therefore used to control various ones of the equalizer/pre-emphasis parameters. These parameters include, for example pre-emphasis magnitude, duration and polarity; reference voltage magnitudes and accumulation and/or depletion signal magnitudes. One particular implementation, as illustrated in FIG. 11, assigns a different low frequency "dither" signal ($f_1, f_2, \ldots$) to each parameter to be controlled. Analog feedback circuit 98 is then used to separate out each of these selected control frequencies, creating a set of control "signature" signals prior to applying them as an input to digital logic element 100. Analog feedback circuit 98 also conditions each of the control channels with an appropriate loop time constant to eliminate instabilities. After digitizing through A/D converter 99, the control signals are provided as an input to a system of digital logic gates within digital logic element 100, the gates configured to maximize (or minimize) a particular control signal. The output of the logic gates then applies the proper modification to the equalizer parameters, using a prescribed algorithm (that may either be fixed or adaptive). The output from digital logic element 100 may also be applied as an input through a system interface 102 to an external control system (not shown) for error reporting and/or for the installation of new, updated algorithms. The values presented to digital logic element 100 are then used to determine the changes to voltage levels and/or pulse durations to be used by pre-emphasis circuit 18.

Figure 12:
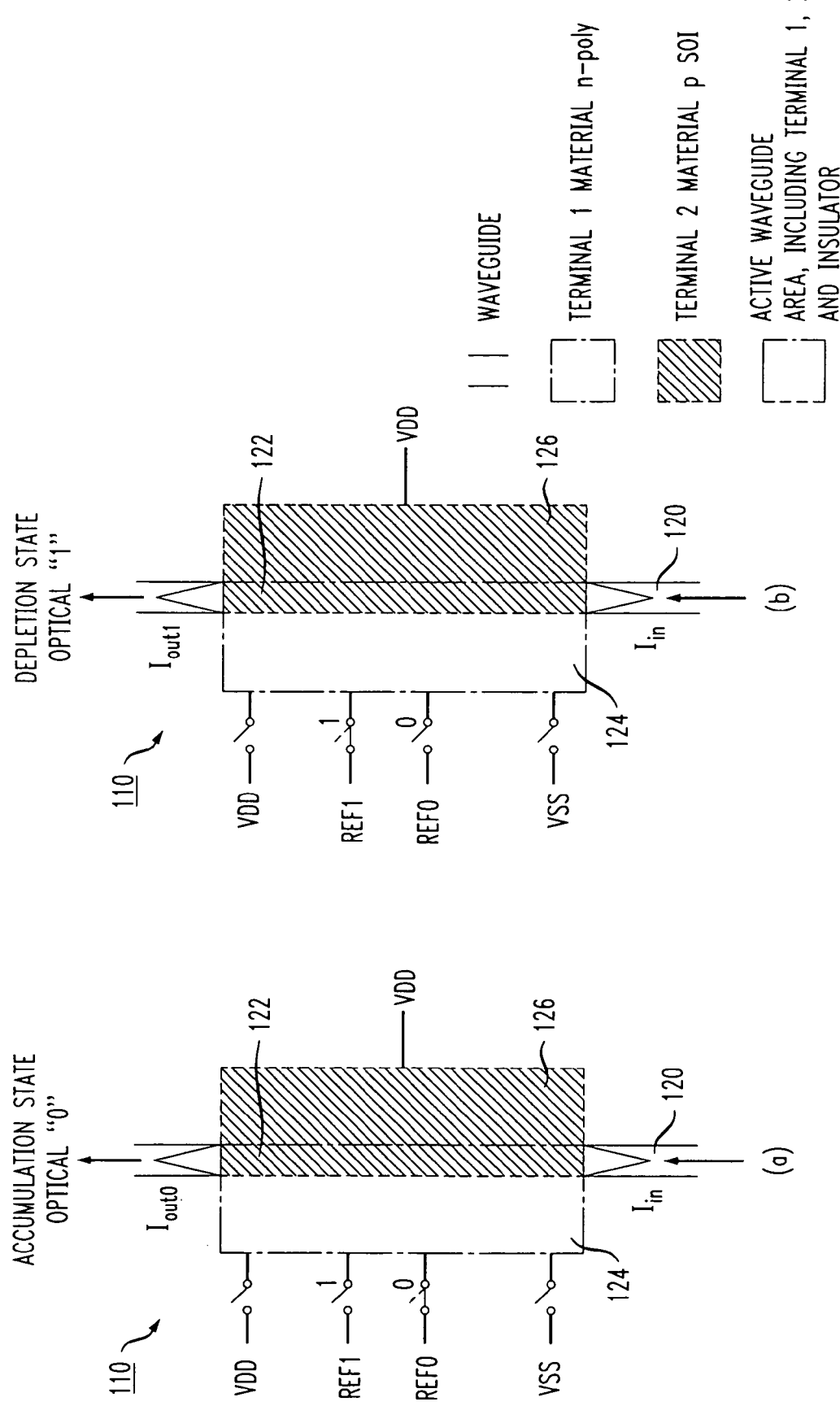
FIG. 12 illustrates an exemplary absorption-based modulator that may use the pre-emphasis technique of the present invention to increase the switching speed of the modulator.

It is to be understood that the pre-emphasis technique of the present invention is applicable to any type of silicon-based electro-optic modulator. In terms of a Mach-Zehnder interferometer, the technique can be used with symmetric interferometers (i.e., 50:50 split of input optical signal along each arm) as well as for asymmetric interferometers (unequal split). Although the particular arrangements described above held one terminal (in this case, "terminal 2") at a constant reference value while changing the reference value of the remaining terminal, it is also possible to apply different voltage levels and offsets to each terminal to generate the same pre-emphasis pulses, as well as the optical "1" and optical "0" output values. Indeed, the arrangement of the present invention is equally applicable for use with linear modulators as with nonlinear, digital devices. Regarding the use of the pre-emphasis technique with other types of modulators, FIG. 12 illustrates an exemplary absorption-based modulator that may use the pre-emphasis technique of the present invention to increase the switching speed of the modulator.

An electro-absorption modulator can be formed using a MOSCAP device driven such that the free carrier absorption is maximized. Absorption can be controlled by a modulating electrical voltage such that, under the correct conditions, a "0" (or low) modulating signal causes the optical signal from an optical source to be partially absorbed (accumulation state) by the modulator, and a "1" (or high) modulating signal causes the modulator to allow the signal to pass through substantially unabsorbed (depletion state). A DC optical input signal will therefore either be substantially absorbed or not absorbed, as a function of the electrical data signal input, generating a modulated optical output signal. FIG. 12(a) illustrates an exemplary electro-absorption modulator 110 of the present invention in the accumulation state. Electro-absorption modulator 110 includes an input waveguide 120, similar to the modulators described above, where input waveguide 120 comprises a selected portion of the relatively thin SOI layer of an SOI structure. The DC optical input signal, $I_{in}$, is applied as an input to waveguide 120. An active waveguide area 122 is formed, in this case, by the overlap of a section of doped silicon (usually, polysilicon) layer 124 (defined as "terminal 1" material) with a section of doped SOI material 126 (defined as "terminal 2" material). In this embodiment, a thin dielectric layer is disposed between these layers (not visible in the top view illustration of FIG. 12).

Figure 13:
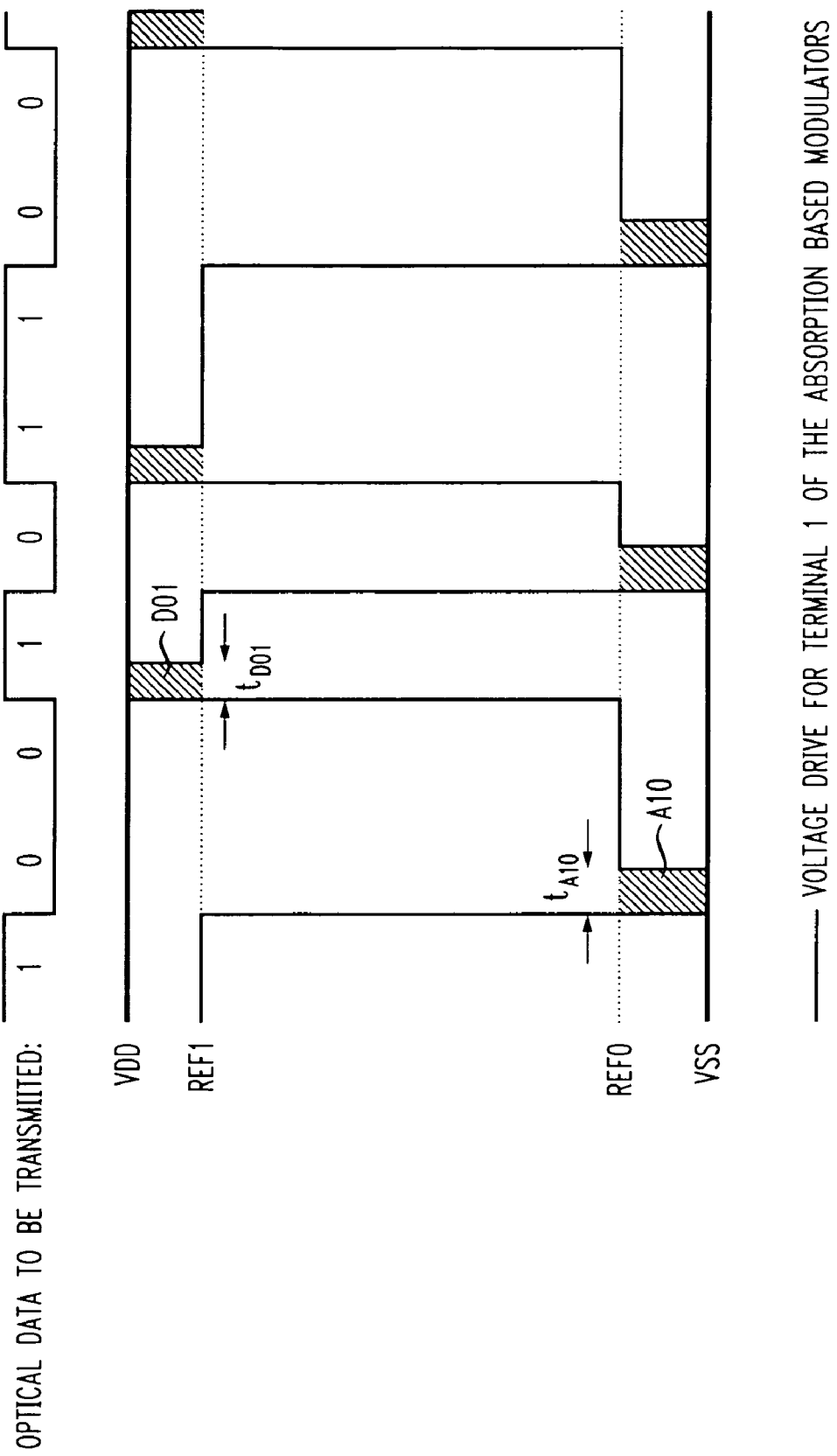
FIG. 13 is a graph of the reference voltages and drive patterns associated with the arrangement of FIG. 12.

To obtain an optical "0" output in this particular configuration, terminal 2 is held at a pre-determined reference value (e.g., VDD), with the terminal 1 electrical contact set to a value associated with the accumulation state that will absorb a sufficient quantity of the optical signal. The optical output from FIG. 12(a) is thus illustrated as $I_{out0}$. FIG. 12(b) illustrates electro-absorption modulator 110 in the depletion state, with the application of a voltage associated with allowing the optical signal to propagate along active waveguide area 122 essentially unchanged, the output thus representative of an optical "1" and denoted as $I_{out1}$. FIG. 13 is a graph of the reference voltages and drive patterns associated with the arrangement of FIG. 12. In accordance with the present invention, during a transition between an optical "1" and optical "0" (i.e., a falling edge transition), the relatively high voltage associated with maintaining the optical "1" state is dropped to the VSS rail, in the form of a pulse lasting for a predetermined time duration $t_{A10}$ (pulse A10). At the end of this pulse, the reference voltage (REF0) applied to the "terminal 1" material of section 124 is then maintained at a relatively low reference voltage associated with the optical "0" value, this voltage being slightly greater than VSS. In a similar fashion, during a transition between an optical "0" and an optical "1" (leading edge transition), the voltage will be increased to the VDD rail, for a pulse of duration $t_{D01}$ (pulse D01) before returning to the voltage level (REF1) associated with maintaining the optical "1" value. Thus, as with the case of the electro-optic interferometer, an electro-absorption modulator may also provide increased switching speeds, in accordance with the present invention, by accelerating the movement of free carriers during the initial transition between logic levels.

Various other modulator improvement techniques discussed above in association with the Mach-Zehnder interferometer are equally applicable for use with the electro-absorption modulator. For example, the doping profile within regions 124 and 126 can be controlled to provide for relatively light doping in active waveguide area 122 (preferred to minimize optical loss) and relatively heavy doping in the contact areas (preferred to maximize switching speed). Further, optical reflections at the input and output of active waveguide area 122 can be minimized by including tapers in the topography of polysilicon area 124, the tapers introducing a gradual change in the effective index seen by an optical signal propagating through the active waveguide area. Moreover, transit time skew problems may be addressed by utilizing a plurality of contact regions formed along the length of the terminal 1 contact (region 124) and terminal 2 (region 126).

Figure 14:
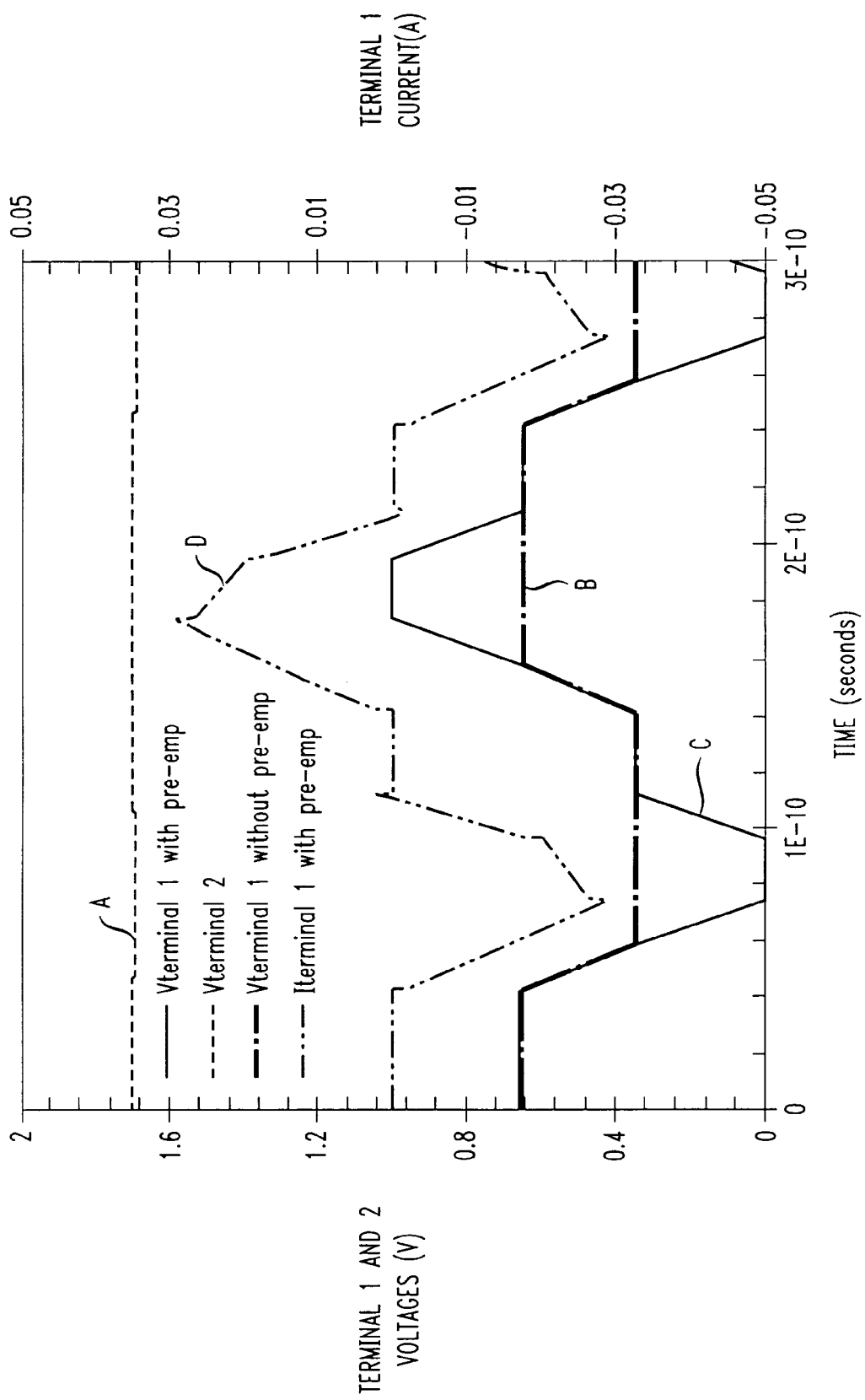
FIG. 14 contains a plot illustrating the improvement in switching speed of an electro-optic modulator using equalization/pre-emphasis in accordance with the present invention associated with the accumulation case.
Figure 15:
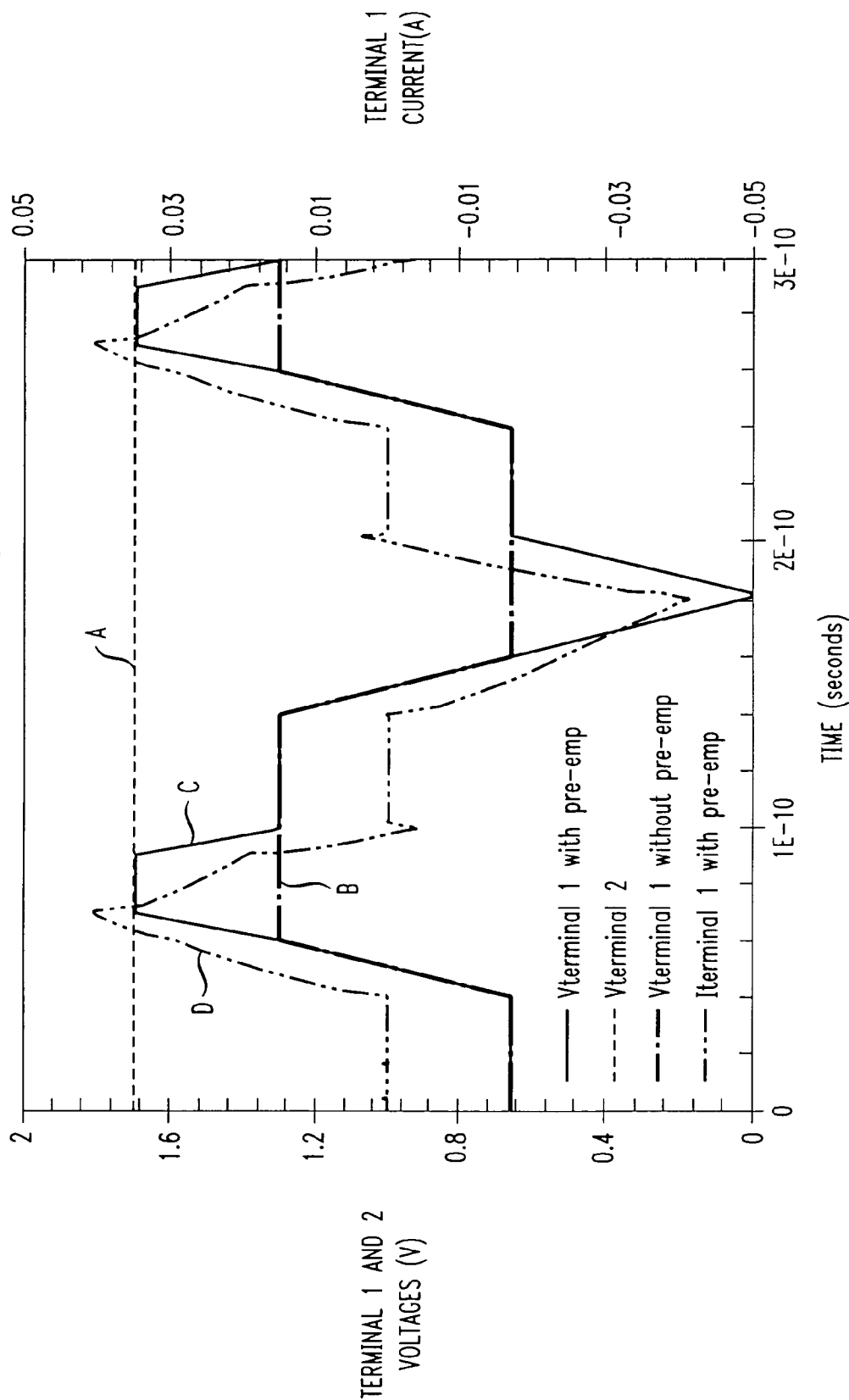
FIG. 15 contains a plot illustrating the improvement in switching speed of an electro-optic modulator using equalization/pre-emphasis in accordance with the present invention associated with the depletion case.

FIGS. 14 and 15 contain plots illustrating the improvement in switching speed of an electro-optic modulator using equalization/pre-emphasis in accordance with the present invention. The values illustrated in FIG. 14 are simulated values associated with the accumulation case and the values illustrated in FIG. 15 are simulated values associated with the depletion case. Indeed, these values may be compared to the ideal case shown in FIG. 6. For the nonlinear accumulation case shown in FIG. 14, the voltage applied to "terminal 2" (the SOI layer of a modulator structure) is constant, in this example at a value of 1.7V as shown by curve A. For an arrangement without pre-emphasis, the modulating voltage applied to the polysilicon "terminal 1" is illustrated as curve B, switching between an optical "1" value of 0.65V and an optical "1" value of 0.35V. Curve C illustrates the same modulating voltage, in this case including pre-emphasis in accordance with the teachings of the present invention. In this case, the pre-emphasis pulse is selected to have a magnitude such that the pulse reaches VSS before returning to the steady-state optical "1" value of 0.35V. As shown, the addition of the pre-emphasis results in an increased terminal 1 charging current with shorter decay time resulting from the larger dv/dt (illustrated as curve D). After removal of the pre-emphasis pulse, the terminal 1 charging current returns to zero, which indicates reaching the desired optical state within the bit interval. For this example, the "1" to "0" and "0" to "1" pre-emphasis voltage magnitude and duration are equal. This is not necessarily the case.

FIG. 15 contains similar results for the nonlinear depletion case, where again the voltage applied to the SOI layer (terminal "2" in the previous figures) is held at a value of 1.7V (that is, essentially the same value as used for the accumulation arm, as discussed above). The switching voltage applied to terminal "1", labeled as curve B, is shown to rise from a value of 0.7V to 1.3V. It is to be noted that a voltage approximately twice in magnitude to that associated with the accumulation case is required to generate the same free carrier change to achieve approximately π/2 radian phase shift in each arm of the modulator shown in FIG. 4. Curve C illustrates a modified voltage to be applied to terminal "1", including a pre-emphasis pulse as proposed in accordance with the present invention. The pulse as illustrated in FIG. 15 has a magnitude that brings the optical "1" voltage applied to terminal 1 for the depletion case essentially equal to the optical "1" voltage applied to terminal 1 for the accumulation case shown in FIG. 14. This is not necessarily the case. For this example, the "1" to "0" and "0" to "1" pre-emphasis voltage magnitude and duration are not equal, representing a more general case. The resulting current plot, as shown in curve D, like the current plot of FIG. 14, illustrates an improvement in terms of steeper rise and fall times, with very little noticeable overshoot, all indications of the speed improvement that can be achieved by using pre-emphasis in accordance with the present invention.

Figure 16:
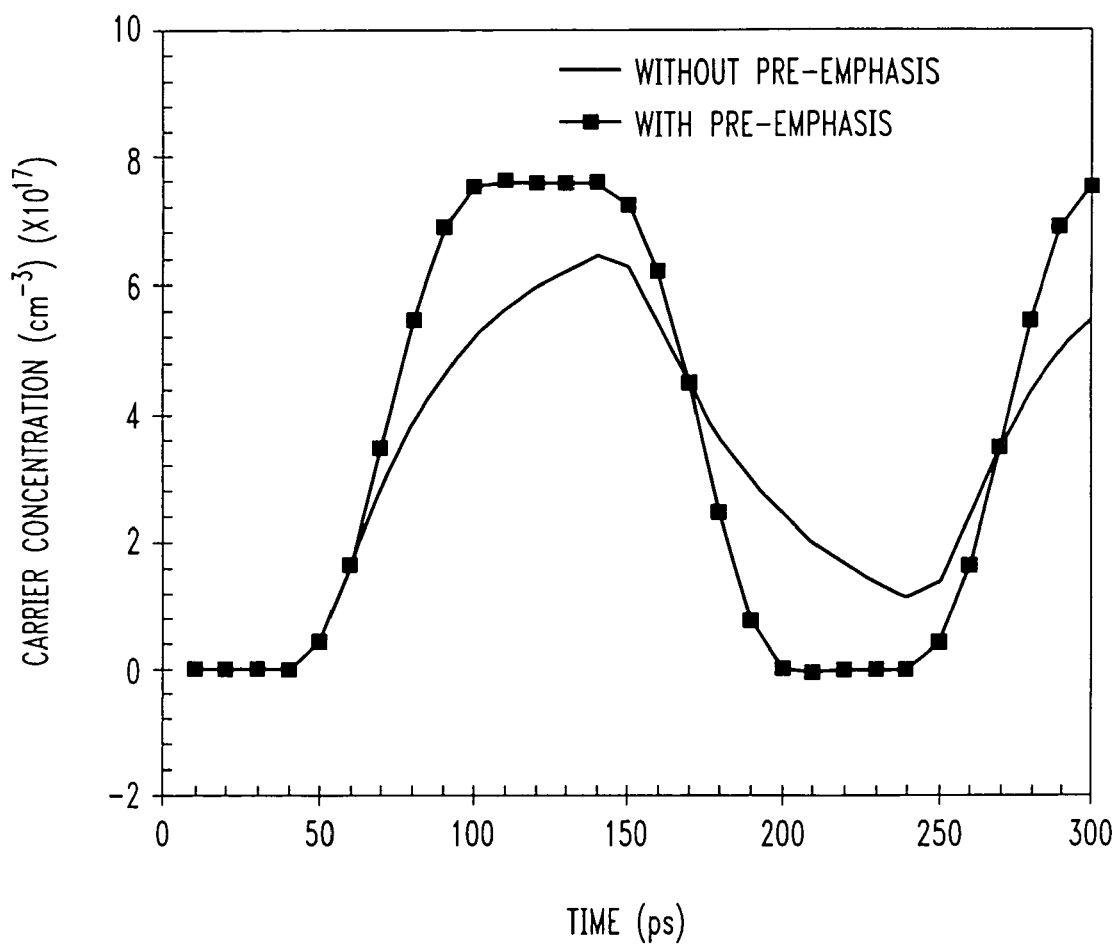
FIG. 16 illustrates the change in carrier concentration performance as a function of time with and without applying pre-emphasis pulses.

The significant improvement in switching speed as a result of using pre-emphasis in accordance with the present invention is also evident by the graph of FIG. 16, which illustrates the change in carrier concentration as a function of time. Without using pre-emphasis, it is clear that for both the rising edge and falling edge there is a significant time delay, with the neither full optical "1" or "optical "0" free carrier concentrations being obtained. In contrast, for an arrangement using pre-emphasis in accordance with the present invention, the delays on both the rising edge and falling edge are significantly reduced, with both the optical "1" and optical "0" levels being reached, and maintained, for a significant portion of the bit period.

As other embodiments of the invention will occur to those skilled in the art, the scope of the present invention is to be defined by the terms of the following claims and recognized equivalents. For example, the p-type doping of the SOI layer and the n-type doping of the overlying silicon layer may be interchanged, with the appropriate reversals in the polarity of the applied voltages. Additionally, there may be cases where pre-emphasis is only required on a rising edge of the data pattern, or only on the falling edge (for the nonlinear case). Moreover, as mentioned above, the technique of the present invention is equally applicable to a system utilizing a linear (e.g., AM) input data signal. In summary, therefore, the scope of the present invention is considered to be limited only by the scope of the claims appended hereto.

What is claimed is:

1. An arrangement for generating a high speed optical output signal modulated by an input data pattern, the arrangement comprising an electro-optic modulator responsive to an optical input signal and a modulating electrical input signal for generating the modulated optical output signal, the electro-optic modulator comprising a free carrier-based modulator utilizing changes in carrier density to generate the modulated optical output signal;

an equalizer/pre-emphasis module disposed at the electrical input to the electro-optic modulator, the equalizer/pre-emphasis module for inserting a first pre-emphasis pulse of a predetermined magnitude and a predetermined duration into the modulating electrical input signal at each transition between a first data value and a second data value of the input data pattern and inserting a second pre-emphasis pulse of a predetermined magnitude and a predetermined duration at each transition between the second data value and the first data value, the second pre-emphasis pulse having a polarity opposite to the first pre-emphasis pulse, the inserted first and second pre-emphasis pulses for extending the bandwidth of the electro-optic modulator without increasing the optical loss thereof; and a control module responsive to a portion of the modulated optical output signal for measuring the modulated optical output signal and determining optimum values for at least one operating parameter from the set of: the first pre-emphasis pulse duration, the second pre-emphasis pulse duration, the first pre-emphasis pulse magnitude and the second pre-emphasis pulse magnitude, the control module including a feedback element to continuously measure a portion of the modulated optical output signal and update the magnitude and duration values of the first and second pre-emphasis pulses in association with changing operating conditions, the control module further comprising a look-up table including listings of pre-emphasis pulse magnitude and duration values associated with changing operating conditions.

2. The arrangement as defined in claim 1 wherein the output from the electro-optic modulator is a linear, analog signal.

3. The arrangement as defined in claim 1 wherein the output from the electro-optic modulator is a nonlinear, digital signal.

4. The arrangement as defined in claim 1 wherein the control module supplies the determined optimum values to the equalizer/pre-emphasis arrangement to set the operating characteristics of the inserted first and second pre-emphasis pulses at the completion of the fabrication process.

5. The arrangement as defined in claim 1 wherein the control module is adaptive with respect to real-time updating of the pre-emphasis pulse magnitude and duration values stored in the look-up table.

6. The arrangement as defined in claim 1 wherein the control module comprises an interface to accept updates for the look-up table values from an external source.

7. The arrangement as defined in claim 1 wherein the electro-optic modulator is an interferometer including an optical splitter disposed at the modulator input to divide the optical input signal into a first arm and a second arm;

a first modulation element disposed along the first arm, the first modulation element having a first region of a first conductivity type and a second region of a second conductivity type;

a second modulation element disposed along the second arm, the second modulation element having a first region of the first conductivity type and a second region of the second conductivity type; and an optical combiner disposed at the modulator output to combine the modulated optical output signals from the first and second arms, wherein the modulating electrical input signal is applied to at least one of the first and second modulation elements to generate the modulated optical output signal.

8. The arrangement as defined in claim 7 wherein the modulating electrical input signal, in association with the input data pattern, comprises a first reference voltage (REF0A) representative of a logic "0" value for the first modulation element, a second reference voltage (REF0D) representative of a logic "0" for the second modulation element, a third reference voltage (REF1A) representative of a logic "1" value for the first modulation element, and a fourth reference voltage (REF1D) representative of a logic "1" value for the second modulation element, with a non-modulating potential voltage (REF) applied to one region of each modulation element.

9. The arrangement as defined in claim 8 wherein the the control module, responsive to the modulated optical output signal, functions to adjust at least one modulator parameter selected from the group consisting of: the first, second, third and fourth reference voltages, the non-modulating potential voltage, the pre-emphasis pulse magnitude and the pre-emphasis pulse duration to optimize modulator performance as a function of time.

10. The arrangement as defined in claim 9 wherein a separate low frequency control signal is applied to each selected modulator parameter and the control module further comprises an analog feedback element for separating out by filtering each low frequency control signal component present in the modulated optical output signal, the control module for analyzing the recovered low frequency signals to determine adjustments to the specific modulator parameters associated with certain low frequency signals.

11. The arrangement as defined in claim 9 wherein the control module further comprises a photodetector for capturing a portion of the modulated optical output signal and converting the captured portion into an analog electrical feedback signal;

an A/D converter for converting the analog electrical feedback signal into a plurality of digital feedback signals; and a digital logic unit coupled to the output of the A/D converter, wherein the plurality of digital feedback signals are analyzed by the digital logic unit using digital signal processing techniques.

12. The arrangement as defined in claim 11 wherein the digital signal processing techniques include rapid convergence algorithms for one or more loop equations for each selected parameter.

13. The arrangement as defined in claim 9 wherein the control module further comprises an interface for communicating with an external source to update the processes of the digital logic unit.

14. The arrangement as defined in claim 13 wherein the control module transmits and receives updated information through the interface to a reporting device at an external source.

15. The arrangement as defined in claim 9 wherein the control module further comprises
    a photodetector for capturing a portion of the modulated optical output signal and converting the captured portion into an analog electrical feedback signal;
    an A/D converter coupled to the photodetector for converting the analog electrical feedback signal into a digital electrical feedback signal;
    a control element responsive to the digital electrical feedback signal to determine changes in modulated optical output signal quality; and
    a look-up table coupled to the control element, the look-up table including listings of a plurality of different values for each modulator parameter for a plurality of different operating conditions, wherein the control element uses determined changes in the modulated optical output signal to find appropriate modulator parameter values from the look-up table.

16. The arrangement as defined in claim 1 wherein the electro-optic modulator is an absorption modulator comprising
    a first semiconductor element doped with a first conductivity type; and
    a second semiconductor element doped with a second conductivity type, with a relatively thin dielectric layer disposed between, wherein the application of the modulating electrical input signal causes the optical input signal to be partially absorbed by the first and second elements for the optical "0" state and to be essentially unabsorbed for the optical "1" state, generating the modulated optical output signal, the pre-emphasis pulse thus accelerating the change between the absorbing state and the unabsorbing state.

17. The arrangement as defined in claim 16 wherein the arrangement further comprises
    a control module responsive to a portion of the modulated optical output signal for measuring the modulated optical output signal and determining optimum values for at least one operating parameter selected from the set of: the first pre-emphasis pulse duration, the second pre-emphasis pulse duration, the first pre-emphasis pulse magnitude and the second pre-emphasis pulse magnitude.

18. The arrangement as defined in claim 17 wherein the control module supplies the determined optimum values to the equalizer/pre-emphasis arrangement to set the operating characteristics of the inserted first and second pre-emphasis pulses at the completion of the absorption modulator fabrication process.

19. The arrangement as defined in claim 17 wherein the control module includes a feedback element to continuously measure a portion of the modulated optical output signal and update the magnitude and duration values of the first and second pre-emphasis pulses in associated with changing operating conditions.

20. The arrangement as defined in claim 17 wherein the control module further comprises a look-up table including listings of pre-emphasis pulse magnitude and duration values associated with changing operating conditions.

21. The arrangement as defined in claim 1 wherein the output impedance of the equalizer/pre-emphasis module approaches an ideal voltage so as to minimally impact the switching speed of the electro-optic modulator.

22. A free-carrier based electro-optic interferometer comprising
    a first arm including a first optical waveguide;
    a second arm including a second optical waveguide;
    an optical splitter for dividing an optical input signal into a first input signal to be coupled into the first arm and a second input signal to be coupled into the second arm;
    a first free carrier-based modulation element disposed along the first arm, the first modulation element having a first region of a first conductivity type and a second region of a second conductivity type and utilizing changes in carrier density to generate a first modulated optical output signal, wherein the application of the modulating electrical input signal to the first free carrier-based modulation element generates free carrier movement so as to modulate the free carrier density in the first and second regions and introduce a modulation in the refractive index of the waveguide, thereby creating the first modulated optical output signal; and
    a second free carrier-based modulation element disposed along the second arm having a first region of the first conductivity type and a second region of the second conductivity type and utilizing changes in carrier density to generate a second modulated optical output signal, wherein the application of the modulating electrical input signal to the second free carrier-based modulation element generates free carrier movement so as to modulate the free carrier density in the first and second regions in the second modulation element and introduce a modulation in the refractive index of the waveguide, thereby creating the second modulated optical output signal;
    an optical combiner disposed at the output of the first and second arms to combine the first and second modulated optical output signals from the first and second arms, wherein the electrical modulating signal is applied to at least one of the first and second modulation elements to form a modulated optical output signal;
    an electrical signal source for generating a first reference voltage (REF0A) representative of a logic "0" value for the first modulation element, a second reference voltage (REF0D) representative of a logic "0" value for the second modulation element, a third reference voltage (REF1A) representative of a logic "1" value for the first modulation element, a fourth reference voltage (REF1D) representative of a logic "1" value for the second modulation element, and a non-modulating potential voltage (REF) to be applied to one region of each modulation element; and
    a feedback module, responsive to the modulated optical output signal, to adjust at least one modulator parameter selected from the group consisting of: the first, second, third and fourth reference levels, and the non-modulating potential voltage to optimize interferometer performance as a function of time.

23. The arrangement as defined in claim 22 wherein a separate low frequency control signal is applied to each selected modulator parameter and the feedback module further comprises a filter for separating out each low frequency control signal component present in the modulated optical output signal, the feedback module for analyzing the recovered low frequency signals to determine adjustments to the selected interferometer parameters.

24. The arrangement as defined in claim 22 wherein the feedback module further comprises an A/D converter for generating a plurality of digital feedback signals, wherein the plurality of digital feedback signals are analyzed by the feedback module using digital signal processing techniques.

* * * * *